Jan. 30, 1968 RINZO IWAI ET AL 3,366,300

SINGLE CAPSTAN TAPE FEEDING MECHANISM

Filed March 11, 1966 3 Sheets-Sheet 1

3,366,300
Patented Jan. 30, 1968

3,366,300

SINGLE CAPSTAN TAPE FEEDING MECHANISM

Rinzo Iwai, Tokyo, Makoto Wasai, Yokohama-shi, and Tokio Tatsuta, Kawasaki-shi, Japan, assignors to Fujitsu Limited, Kawasaki, Japan, a corporation of Japan Filed Mar. 11, 1966, Ser. No. 533,467
10 Claims. (Cl. 226—50)

The present invention relates to a single capstan tape feeding mechanism. More particularly, the invention relates to a single capstan feeding mechanism for magnetic tape.

The principal object of the present invention is to provide a new and improved single capstan tape feeding mechanism.

An object of the present invention is to provide a tape feeding mechanism for feeding a tape with great reliability, accuracy, efficiency, effectiveness and stability.

Another object of the present invention is to provide a tape feeding mechanism for feeding a tape at high speed without damage or breakage.

Another object of the present invention is to provide a tape feeding mechanism which is of simple structure and is controlled with facility.

Another object of the present invention is to provide a tape feeding mechanism which is inexpensive to manufacture.

In accordance with the present invention, a tape feeding mechanism comprises a first drive roller which is rotated continuously in a first direction about its axis. A second drive roller spaced from the first drive roller is rotated continuously in a second direction opposite to the first direction about its axis. A capstan is mounted in proximity with the first and second drive rollers for rotation about its axis and for moving the capstan into driving engagement with a selected one of the first and second drive rollers. A braking device is positioned in operative proximity with the capstan and a control arrangement is coupled to the capstan mounting and to the braking device for selectively controlling the operation of the braking device and the movement of the capstan. An information storing tape is supported on the capstan for movement in the forward direction when the capstan is rotated in the first direction and for movement in a reverse direction when the capstan is rotated in the second direction.

In accordance with the present invention, the braking device comprises a pair of spaced elongated brake armatures positioned transverse to and astride the capstan with one end of each of the pair of brake armatures in operative proximity with the capstan. An armature mount pivotally mounts the pair of brake armatures for pivotal movement toward and away from the capstan. The ends of the pair of brake armatures are pivotally moved toward each roller into braking engagement with the capstan by an electromagnet of the control arrangement. The electromagnet for pivotally moving the pair of brake armatures and the armature mount are positioned to move the capstan into spaced relation from each of the first and second drive rollers at the same time that it moves the ends of the pair of brake armatures into braking engagement with the capstan. The mounting of the capstan includes means for disengaging and engaging the brake armature from the capstan prior to the moving of the capstan into driving engagement with one of the driving rollers.

In order that the present invention may be readily carried into effect, it will now be described with reference to the accompanying drawings, wherein.

In the figures, the same components are identified by the same reference numerals.

Figure 1:
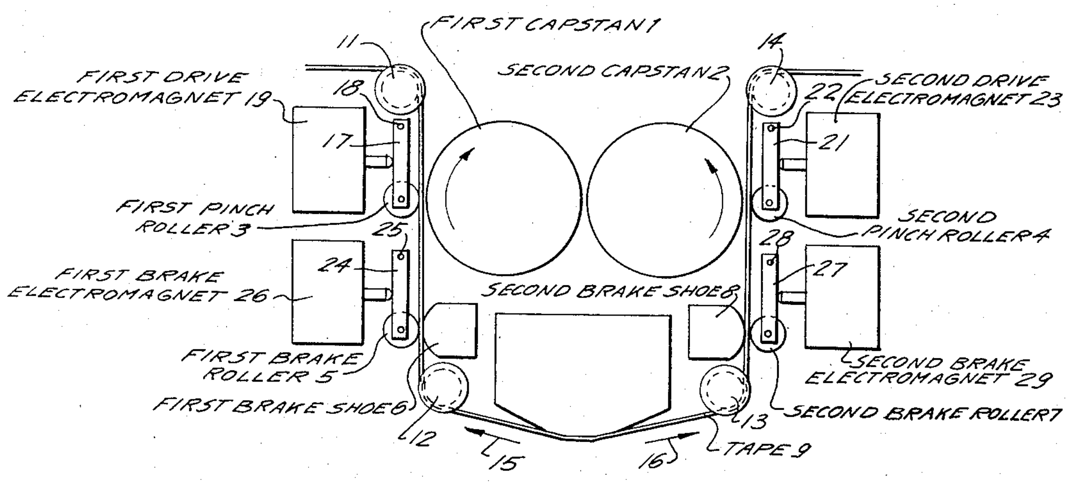
FIG. 1 PRIOR ART
FIGURE 1 is a schematic diagram of a two capstan tape feeding mechanism of the prior art.

In FIG. 1, a first capstan 1 and a second capstan 2 rotate in opposite directions, so that if the first capstan 1 rotates in clockwise direction, as shown in FIG. 1, the second capstan rotates in counterclockwise direction, as shown. A first pinch roller 3 is positioned in proximity with the first capstan 1 and a second pinch roller 4 is positioned in proximity with the second capstan 2. A first brake roller 5 is positioned in the area of the first pinch roller 3 and a first brake shoe 6 is positioned in the area of the first capstan 1 in proximity with the first pinch roller. A second brake roller 7 is positioned in the area of the second pinch roller 4 and a second brake shoe 8 is positioned in the area of the second capstan 2 in proximity with the second pinch roller.

A tape 9 is movably supported by guide or support rollers 11, 12, 13 and 14 for movement in the direction of an arrow 15 or in the opposite direction of an arrow 16. The tape 9 is positioned by the guide rollers 11, 12, 13 and 14 so that it extends between the first capstan 1 and the first pinch roller 3, between the first brake roller 5 and the first brake shoe 6, between the second brake roller 7 and the second brake shoe 8 and between the second capstan 2 and the second pinch roller 4. The tape feeding mechanism of FIG. 1 is a pinch roller mechanism, in which the tape 9, which may comprise any suitable tape, ribbon or wire such as, for example, a data storage medium such as magnetic tape, may be fed in the direction of either the arrow 15 or the arrow 16.

When the first pinch roller 3 is moved toward the first capstan 1 until the tape 9 is in frictional abutment or engagement with each of said first pinch roller and said first capstan, said tape is moved in the direction of the arrow 15 by said first capstan. When the first brake roller 5 is moved toward the first brake shoe 6 until the tape 9 is in frictional abutment or engagement with each of said first brake roller and said first brake shoe, said tape is rapidly stopped. When the second pinch roller 4 is moved toward the second capstan 2 until the tape 9 is in frictional abutment or engagement with each of said second pinch roller and said second capstan, said tape is moved in the direction of the arrow 16 by said second capstan. When the second brake roller 7 is moved toward the second brake shoe 8 until the tape 9 is in frictional abutment or engagement with each of said second brake roller and said second brake shoe, said tape is rapidly stopped.

The first pinch roller 3 is mounted on an arm or armature 17 which is pivotally mounted at a pivot point 18. The arm 17 is pivotally rotated about its pivot point 18 in a counterclockwise direction, toward the first capstan 1, upon energization of a first drive electromagnet 19, which controls the movement of said arm. The second pinch roller 4 is mounted on an arm or armature 21 which is pivotally mounted at a pivot point 22. The arm 21 is pivotally rotated about its pivot point 22 in a clockwise direction, toward the second capstan 2, upon energization of a second drive electromagnet 23, which controls the movement of said arm.

The first brake roller 5 is mounted on an arm or armature 24 which is pivotally mounted at a pivot point 25. The arm 24 is pivotally rotated about its pivot point 25 in a counterclockwise direction, toward the first brake shoe 6, upon energization of a first brake electromagnet 26, which controls the movement of said arm. The second brake roller 7 is mounted on an arm or armature 27 which is pivotally mounted at a pivot point 28. The arm 27 is pivotally rotated about its pivot point 28 in a clockwise direction, toward the second brake shoe 8, upon energization of a second brake electromagnet 29, which controls the movement of said arm.

A disadvantage of the tape feeding mechanism of FIG. 1 is that if either of the first and second drive electromagnets 19 and 23 is energized simultaneously with either of the first and second brake electromagnets 26 and 29 or if both of said first and second drive electromagnets 19 and 23 are energized simultaneously, the tape 9 is subjected to oppositely directed forces and is damaged or broken. When the tape 9 is damaged or broken, the data recorded therein is irrevocably destroyed. Furthermore, careful maintenance is necessary to avoid malfunction and/or tape damage due to dust or foreign particles which may settle on the various components.

Figure 2:
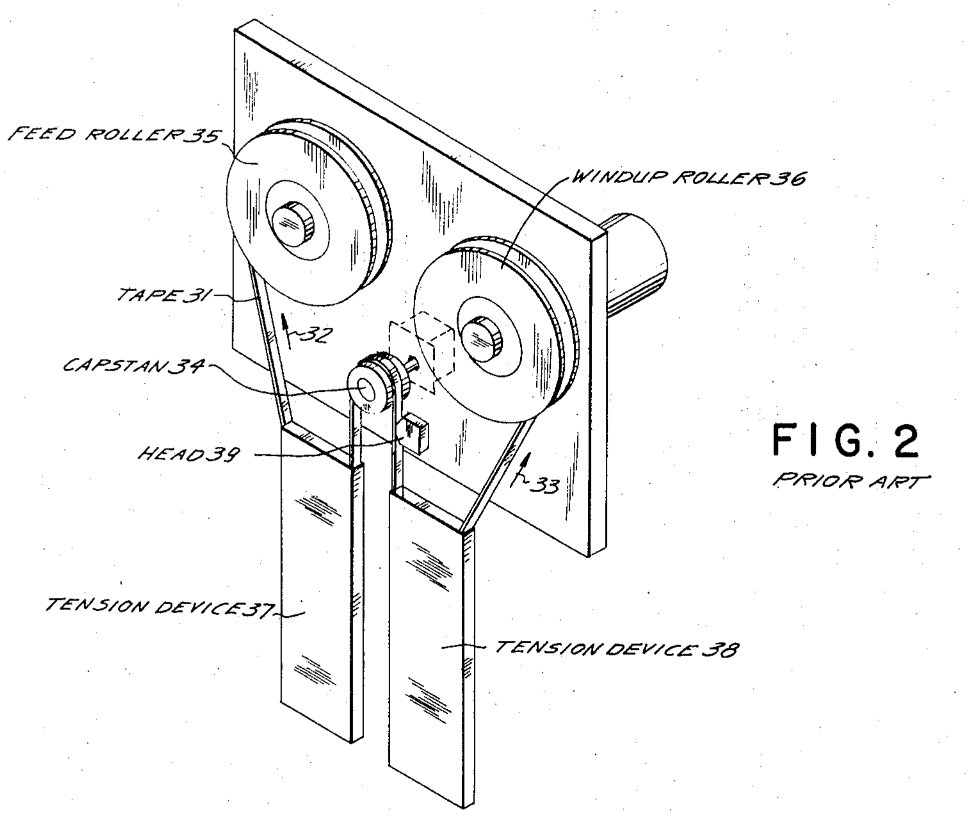
FIG. 2 PRIOR ART
FIG. 2 is a schematic diagram of a single capstan tape feeding mechanism of the prior art.

The single capstan tape feeding mechanism of FIG. 2 overcomes the disadvantage of the two capstan mechanism of FIG. 1. In the prior art single capstan tape feeding mechanism of FIG. 2, a tape 31, which may comprise any suitable tape, ribbon or wire such as, for example, a data storage medium such as magnetic tape, may be fed in the direction of either arrow 32 or arrow 33. The tape 31 is supported by a single capstan 34 on which it hangs. The capstan 34 is positioned between a feed roller 35 and a windup roller 36 which supply the tape 31 in the direction of the arrow 33 in forward operation and in the direction of the arrow 32 in reverse operation.

A pair of vacuum columns or tension devices 37 and 38 are positioned on both sides of the capstan 34 at a short distance therefrom. The tape 31 hangs in a first loop which is positioned in the tension device 37 where it is maintained in suitable tension and hangs in a second loop which is positioned in the tension device 38 where it is maintained in suitable tension. The capstan 34 is rotated in either a clockwise or a counterclockwise direction to move the tape 31 in the direction of the arrow 32 or in the direction of the arrow 33, respectively. The tape 31 is stopped by stopping the rotation of the capstan 34. A head 39 is positioned in operative proximity with the tape 31 for read-in and/or read-out of data to and/or from said tape. The principal forces on the tape 31 are applied by the capstan 34. The single capstan tape feeding mechanism functions effectively without damage to or breakage of the tape.

Figure 3:
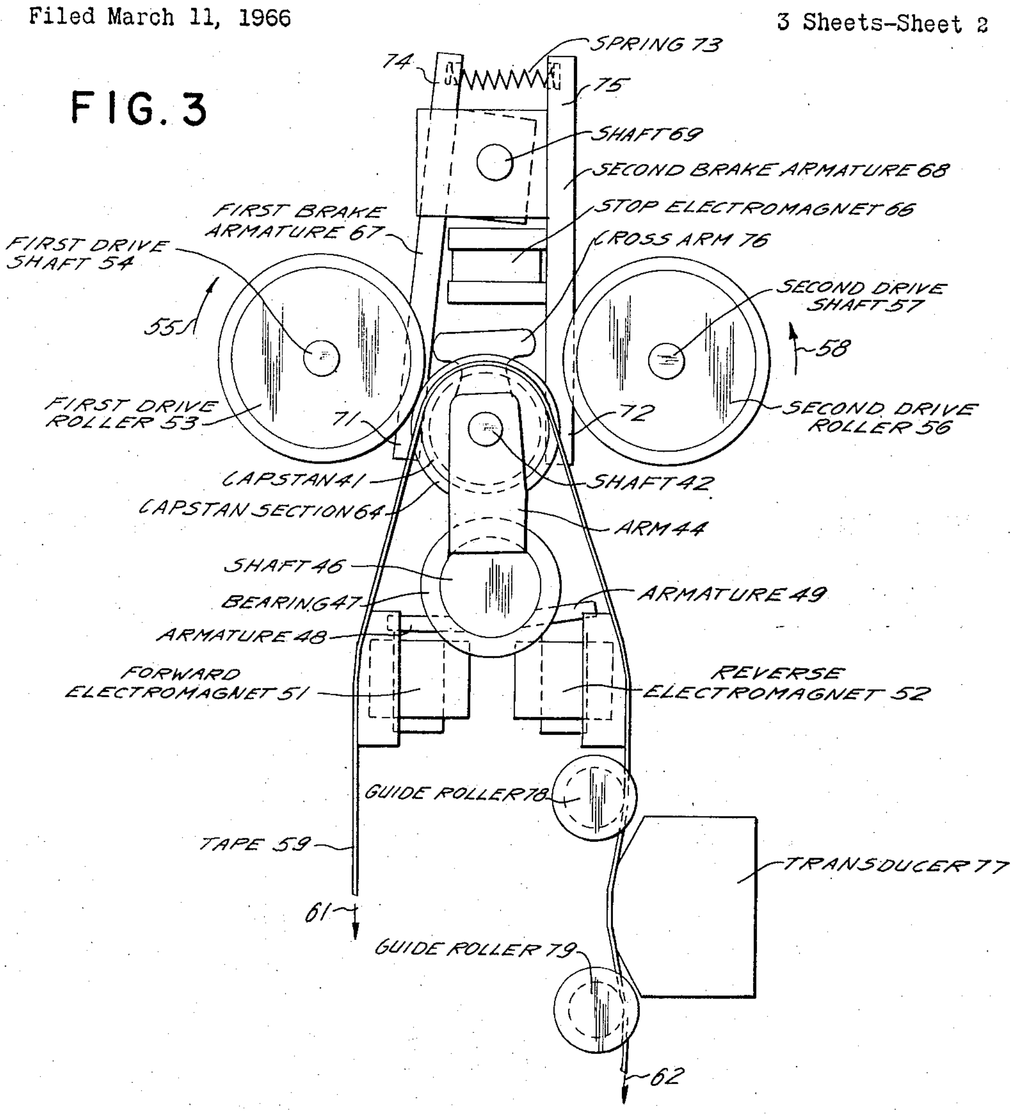
FIG. 3 is a schematic diagram of an embodiment of the single capstan tape feeding mechanism of the present invention.
Figure 4:
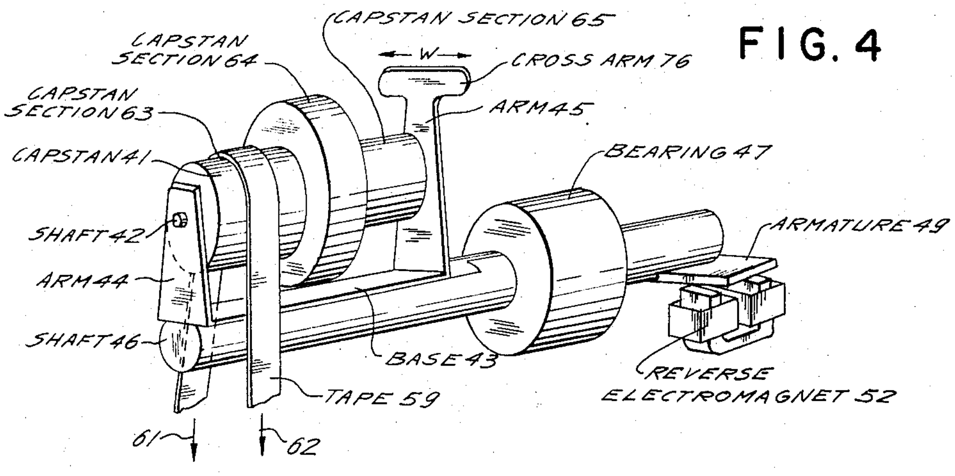
FIG. 4 is a perspective view of the embodiment of FIG. 3.

The single capstan tape feeding mechanism of the present invention is considerably less expensive to manufacture than the single capstan mechanism of the prior art. In FIGS. 3 and 4, a capstan 41 is mounted on a shaft 42 which is rotatably mounted on a bracket having a base 43 and spaced arms 44 and 45 in substantially U-shaped configuration. The arms 44 and 45 are substantially parallel to and spaced from each other and have apertures formed therethrough to support the shaft 42. The base 43 of the bracket is affixed by any suitable means to a flat surface formed on a shaft 46 so that the shafts 42 and 46 are positioned in spaced parallel relation to each other and rotation of the shaft 46 in a clockwise direction angularly moves the bracket and the shaft 42 in a clockwise direction and rotation of the shaft 46 in a counterclockwise direction angularly moves the bracket and the shaft 42 in a counterclockwise direction.

The shaft 46 is rotatably supported by a bearing 47 which is mounted in fixed position by any suitable means. On the other side of the bearing 47 from that on which the bracket is affixed, a pair of armatures 48 and 49 are affixed to and extend in opposite directions from the shaft 46. The armatures 48 and 49 may comprise a single armature affixed to the shaft 46 at its center area so that half of said armature extends in one direction and the other half of said armature extends in the opposite direction. A forward electromagnet 51 is fixedly positioned by any suitable means in operative proximity with the armature 48 and a reverse electromagnet 52 is fixedly positioned by any suitable means in operative proximity with the armature 49.

A first drive roller 53 is affixed to and rotates with a first drive shaft 54 which is continuously rotated in a clockwise direction as shown by arrow 55, by any suitable driving means (not shown) such as, for example, a synchronous motor. A second drive roller 56 is affixed to and rotates with a second drive shaft 57 which is continuously rotated in a counterclockwise direction, as shown by arrow 58, by any suitable driving means (not shown) such as, for example, the synchronous motor which drives the first drive shaft 54 and suitable gear coupling means (not shown). Each of the first and second drive rollers 53 and 56 is thus rotated at constant speed in a direction opposite that of the other.

The capstan 41 comprises three coaxially positioned shaft sections of different diameter. A tape 59, which may comprise any suitable tape, ribbon or wire such as, for example, a data storage medium such as magnetic tape, may be fed in the direction of either arrow 61 or arrow 62 by a capstan shaft section 63 of the capstan 41 which supports said tape. A capstan shaft section 64 of the capstan 41 has a larger diameter than the capstan shaft section 63 and is rotated by the first drive roller 53 or the second drive roller 56. A capstan shaft section 65 of the capstan 41 has a diameter which is maller than that of the capstan shaft section 64 and that of the capstan shaft section 63. The capstan 41 is rotated in counterclockwise direction when the peripheral surface of the first drive roller 53 abuts the peripheral surface of the capstan section 64 of said capstan. This moves the tape 59 in the direction of the arrow 61. The capstan 41 is rotated in clockwise direction when the peripheral surface of the second drive roller 56 abuts the peripheral surface of the capstan section 64 of said capstan. This moves the tape 59 in the direction of the arrow 62.

When the forward electromagnet 51 is energized, the armature 48 is attracted by said electromagnet and rotates the shaft 46 counterclockwise, thereby moving the shaft 42 and the capstan 41 counterclockwise so that the capstan section 64 is moved into driving abutment with the first drive roller 53. The first drive roller 53 then drives the capstan 41 in a counterclockwise direction about its shaft 42 so that the tape 59 is moved or fed in the direction of the arrow 61 at the same speed as the rotational speed of said capstan. A suitable frictional surface, having a large coefficient of friction, such as, for example, rubber, is provided on the peripheral surfaces of either the capstan section 64 or the first and second drive rollers 53 and 56, or on all such peripheral surfaces, to ensure good driving contact. A suitable frictional surface of similar type such as, for example, polyurethane rubber or the like, may be provided on the capstan section 63 and the tape 59 may be suitably tensioned to ensure good tape feeding contact of said tape with said capstan section. The tape 59 may be tensioned by any suitable tensioning means (not shown) such as, for example, a vacuum column or a tension member.

A stop electromagnet 66 is fixed positioned by any suitable means in operative proximity with a first brake armature 67 and a second brake armature 68. The first brake armature 67 is pivotally mounted on a shaft 69 and the second brake armature 68 is pivotally mounted on said shaft, each of said armatures being rotatable about said shaft independently of the other. The first and second brake armatures 67 and 68 extend at one end of each to the peripheral surface of the capstan section 65 of the capstan 41 and are spaced from, but in proximity with, said peripheral surface between them. Each of the first and second brake armatures 67 and 68 provides a large braking or damping force or friction at the peripheral surface of the capstan section 65 of the capstan 41 when it is moved into braking abutment with said peripheral surface. Thus, the end 71 of the first brake armature 67 brakes and stops the rotation of the capstan 41 when it is moved into braking abutment with the peripheral surface of the capstan section 65 and the end 72 of the second brake armature 68 simultaneously brakes and stops the rotation of said capstan when it is moved into braking abutment with said peripheral surface at the same time. The combined braking force of the first and second brake armatures 67 and 68 is sufficient to stop the rotation of the capstan 41 instantaneously.

When it is desired to stop the rotation of the capstan 41, the forward electromagnet 51 is deenergized. The shaft 46 is then rotated in a clockwise direction to its neutral position by the first and second brake armatures 67 and 68 and the capstan section 64 of the capstan 41 is thus disengaged from the first drive roller 53 in milliseconds. The stop electromagnet 66 is energized at the same time that the forward electromagnet 51 is deenergized and moves the first and second brake armatures 67 and 68 into braking abutment with the capstan section 65 of the capstan 41 to stop the rotation of said capstan. The stop electromagnet 66 is so positioned that at the same time that it moves the first and second brake armatures 67 and 68 into braking engagement it returns the capstan 41 to its neutral position intermediate and spaced from both drive rollers 53 and 56. In order to avoid abrasion of the capstan section 65 of the capstan 41 and of the ends 71 and 72 of the first and second brake armatures 67 and 68, respectively, which contact said capstan section during the braking operation, the contacting surfaces thereof may be provided with sheets of brake material or long wearing material such as, for example, nylon.

A spring 73 is affixed at one end to the other end 74 of the first brake armature 67 and is affixed at its other end to the other end 75 of the second brake armature 68. The spring 73 provides a compression force which maintains the first and second brake armatures 67 and 68 in position, to maintain the capstan 41 in its neutral position, although the stop electromagnet 66 is deenergized. Thus, as soon as the stop electromagnet 66 has been energized and has positioned the first and second brake armatures 67 and 68 to position the capstan 41 in its neutral position, said stop electromagnet is deenergized and the spring 73 maintains said capstan in position via said first and second brake armatures. This provides economy of operation by avoiding the waste of electrical energy. Furthermore, the maintaining of the stop electromagnet 66 in its deenergized condition ensures rapid initiation of tape movement when desired.

The arm 45 of the bracket affixed to the shaft 46 has a cross arm 76 at its extremity farthest from the base 43 of said bracket. The width W of the cross arm 76 of the arm 45, from end to end, is slightly smaller in magnitude than the diameter of the capstan section 65 of the capstan 41. The width W of the cross arm 76 may, for example, be 0.005 mm. smaller in magnitude than the diameter of the capstan section 65. This prevents the cross arm 76 from interfering with the operation of the first and second brake armatures 67 and 68 to stop the rotation of the capstan 41.

When the tape 59 is to be moved in the forward direction, as indicated by the arrow 61, the forward electromagnet 51 is energized. The energized forward electromagnet 51 attracts the armature 48 and thereby rotates the shaft 46 and the capstan 41 counterclockwise, as hereinbefore described. The capstan section 65 is thus moved against the first brake armature 67 by its counterclockwise rotation and by the force of the spring 73. The cross arm 76 of the arm 45 abuts the first brake armature 67 and moves it clockwise about its pivot shaft 69. Although the bracket which supports the capstan 41 is moved counterclockwise with its supporting shaft 46 under the influence of the forward electromagnet 51, the cross arm 76 of the arm 45 of said bracket is positioned so that the angle or angular distance of counterclockwise movement of said capstan is always smaller than the angle or angular distance of counterclockwise movement of the first brake armature 67. The positioning of the cross arm 76 of the arm 45 of the bracket thus insures that the capstan 41 contacts the first drive roller 53 only after the first brake armature 67 is disengaged from said capstan, so that said capstan is never subjected to force by said roller and said brake armature at the same time.

The capstan is protected from subjection to simultaneous force from the roller and the brake armature even when the forward electromagnet 51 and the stop electromagnet 66 are energized at the same time. This prevents unnecessary wear of the capstan 41, even if the operation of the tape feeding mechanism of the present invention is faulty so that both the stop electromagnet 66 and the forward electromagnet 51 are energized at the same time. Furthermore, this protects the mechanism from accidental damage and prevents unnecessary wear, damage or breakage of the tape 59.

Although the operation of the tape feeding mechanism of the present invention has been described with reference to the forward feed of the tape 59 by operation of the forward electromagnet 51 and the first drive roller 53, the operation of said tape feeding mechanism to provide a reverse feed of said tape by energization of the reverse electromagnet 52 is similar to the forward feed operation and is therefore not described. Furthermore, the braking operation is the same after termination of forward feed and after the termination of reverse feed, the forward feed being assumed to move the tape 59 in the direction of the arrow 61 and the reverse feed being assumed to move said tape in the direction of the arrow 62. A transducer 77 may be positioned in operative proximity with the tape 59 at any suitable location and is preferably utilized with a pair of guide rollers 78 and 79.

Figure 5:
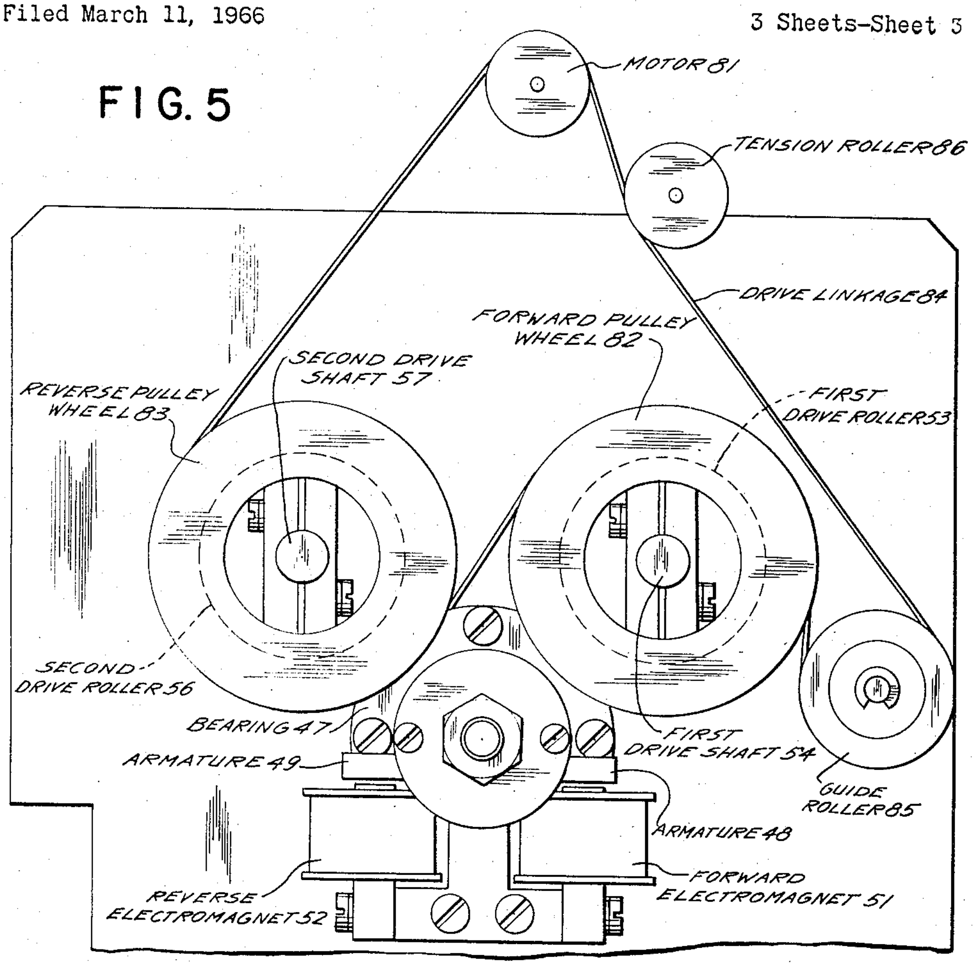
FIG. 5 is a schematic diagram of an embodiment of the driving portion of the tape feeding mechanism of FIGS. 3 and 4.
Figure 6:
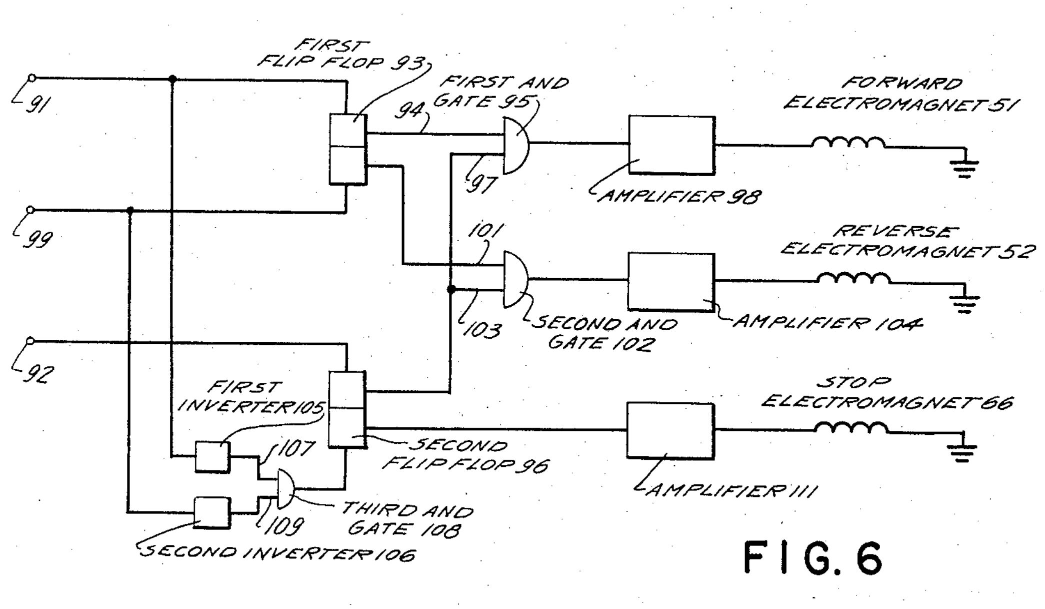
FIG. 6 is an embodiment of a circuit diagram of the driving portion of the tape feeding mechanism of FIGS. 3 and 4.

FIG. 5 shows an embodiment of the driving portion of the tape feeding mechanism of the present invention and FIG. 6 is a circuit diagram for driving the tape feeding mechanism of the present invention. In FIG. 5, which views the tape feeding mechanism from the rear, a motor or a roller or pulley wheel driven by a motor 81 is suitably mounted in fixed position by any suitable means and drives a forward pulley wheel, drive wheel or roller 82 and a reverse pulley wheel, drive wheel or roller 83. The motor 81 drives the forward and reverse pulley wheels 82 and 83 via a drive belt, tape or the like drive linkage 84. The drive linkage 84 is guided bv a guide wheel or guide roller 85 and is kept under proper tension by a tension wheel or tension roller 86.

The first drive roller 52 is affixed to the first drive shaft 54 and the forward pulley wheel 82 is affixed to and rotates with said first drive shaft. The second drive roller 56 is affixed to the second drive shaft 57 and the reverse pulley wheel 83 is affixed to and rotates with said second drive shaft. The motor 81 rotates continuously in one direction such as, for example, a counterclockwise direction, and continuously rotates the first and second drive rollers 53 and 56 at constant speed via the forward and reverse pulley wheels 82 and 83, respectively, the first drive roller being rotated in clockwise direction and the second drive roller being rotated in counterclockwise direction.

FIG. 6 shows a circuit for energizing the forward electromagnet 51, the reverse electromagnet 52 and the stop electromagnet 66. When an electrical signal is supplied to electrical input terminals 91 and 92, a first flip-flop 93 is switched to its set condition and supplies a set output to an input 94 of an AND gate 95. The electrical signal supplied to the input terminals 91 and 92 also switches a second flip-flop 96 to its set condition and supplies a set output to the other input 97 of the first AND gate 95. When both inputs 94 and 97 conduct current to the first AND gate 95, said first AND gate conducts a signal to an amplifier 98 which amplifies the signal and transmits the amplified signal to the forward electromagnet 51 thereby energizing said forward electromagnet. Each of the first and second flip-flops 93 and 96 comprises any suitable bistable multivibrator and each of the AND gates comprises any suitable AND circuit.

When an electrical signal is supplied to electrical input terminals 99 and 92, the first flip-flop 93 is switched to its reset condition and supplies a reset output to an input 101 of a second AND gate 102. The electrical signal supplied to the input terminals 99 and 92 also switches the second flip-flop 96 to its set condition and supplies a set output to the other input 103 of the second AND gate 102. When both inputs 101 and 103 conduct current to the second AND gate 102, said second AND gate conducts a signal to an amplifier 104 which amplifies the signal and transmits the amplified signal to the reverse electromagnet 52 thereby energizing said reverse electromagnet.

When there is no electrical signal supplied to the input terminals 91 and 99, a first inverter 105 produces an output signal from the zero signal at the input terminal 91 and a second inverter 106 produces an output signal from the zero signal at the input terminal 99. The output signal produced by the first inverter 105 is supplied to an input 107 of a third AND gate 108 and the output signal produced by the second inverter 106 is supplied to the other input 109 of said third AND gate. When both inputs 107 and 109 conduct current to the third AND gate 108, said third AND gate conducts a signal to the reset input of the second flip-flop 96 and switches said second flip-flop to its reset condition. When the second flip-flop 96 is switched to its reset condition, it supplies a reset output signal to an amplifier 111 which amplifies the signal and transmits the amplified signal to the stop electromagnet 66 thereby energizing said stop electromagnet.

Energization of the forward electromagnet 51, of the reverse electromagnet 52 or of the stop electromagnet 66 institutes the movement or feeding of the tape 59 in the forward direction 61, the reverse direction 62 or brakes or stops the movement of said tape. The forward feeding of the tape and the braking or stopping of the tape are described with reference to FIG. 3.

In another embodiment of a single capstan tape feeding mechanism, not illustrated herein, the capstan is mounted on and rotates with a shaft which is directly coupled to a DC motor which may be rapidly started and rapidly stopped. The advantage of such an embodiment is that it provides a structure which is closer to ideal than other embodiments and the tape is not subjected to impulse forces. Such embodiment is particularly applicable to high speed tape feeding systems. The disadvantage of such embodiment, however, is that it cannot be made inexpensive, because the DC motor requires speed regulating equipment for controlling start, stop and speed of said DC motor.

In still another embodiment of a single capstan tape feeding mechanism, not illustrated herein, a first clutch for forward feeding, a second clutch for reverse feeding and a third clutch for stopping the tape are provided on the shaft on which the capstan is mounted. The three clutches function to couple and decouple the capstan shaft from a continuously rotating drive shaft. The disadvantages of this embodiment are the unreliability of the clutches, which prevents the use thereof in a high speed tape feeding system and that it cannot be made inexpensive.

Since the capstan 41 is rotated when one of the continuously rotating drive rollers abuts the capstan section 64 of said capstan, if the abutting drive roller is rotating at too high a speed, a small amount of initial slippage of the tape 59 on the capstan section 63 may be incurred and there may be some abrasion between the drive roller and the capstan section 64 when the tape feed is initiated and between the brake armatures 67 and 68 and the capstan section 65 of said capstan when the tape feed is braked or stopped. These difficulties may occur only in high speed tape feeding systems in which the tape speed is higher than 3 meters per second, and do not occur in tape feeding systems in which the tape speed is less than 3 meters per second. Thus, the principal advantages of great reliability and inexpensiveness of manufacture of the tape feeding mechanism of the present invention are attained mostly at low and medium tape speeds.

While the invention has been described by means of a specific example and in a specific embodiment, we do not wish to be limited thereto, for obvious modifications will occur to those skilled in the art without departing from the spirit and scope of the invention.

We claim:

1. A tape feeding mechanism, comprising
   a first drive roller rotated continuously in a first direction about its axis;
   a second drive roller spaced from said first drive roller and rotated continuously in a second direction opposite to said first direction about its axis;
   a capstan;
   mounting means mounting said capstan in proximity with said first and second drive rollers for rotation about its axis and for moving said capstan into driving engagement with a selected one of said first and second drive rollers;
   braking means in operative proximity with said capstan;
   control means coupled to said mounting means and to said braking means for selectively controlling the operation of said braking means and the movement of said capstan; and
   information storing tape supported on said capstan for movement in a forward direction when said capstan is rotated in said first direction and for movement in a reverse direction when said capstan is rotated in said second direction.

2. A tape feeding mechanism as claimed in claim 1, wherein said capstan comprises three coaxially positioned capstan sections of different diameter which rotate as a unit about their axis, one of said capstan sections supporting said tape, a second of said capstan sections being moved into driving engagement with a selected one of said first and second drive rollers and a third of said capstan sections being in operative proximity with said braking means.

3. A tape feeding mechanism as claimed in claim 1, wherein said capstan is positioned substantially intermediate said first and second drive rollers, and said mounting means pivotally mounts said capstan for pivotal movement into driving engagement with a selected one of said first and second drive rollers.

4. A tape feeding mechanism as claimed in claim 3, wherein said mounting means comprises a first rotatable shaft, a substantially U-shaped bracket having a base affixed to said first rotatable shaft and a pair of spaced substantially parallel arms, and a second rotatable shaft rotatably mounted on said arms in parallel relation to and spaced from said first rotatable shaft, said capstan being coaxially mounted on said second rotatable shaft.

5. A tape feeding mechanism as claimed in claim 4, wherein said control means includes armature means extending transversely from opposite sides of said first rotatable shaft and electromagnet means for selectively attracting one side of said armature means to rotate said first rotatable shaft in a first direction and for selectively attracting the other side of said armature means to rotate said first rotatable shaft in a second direction opposite to said first direction.

6. A tape feeding mechanism as claimed in claim 1, wherein said braking means comprises a pair of spaced elongated brake armatures positioned transverse to and astride said capstan with one end of each of said pair of brake armatures in operative proximity with said capstan, armature mountnig means pivotally mounting said pair of brake armatures for pivotal movement toward and away from said capstan, and said control means includes electromagnet means for pivotally moving said ends of said pair of brake armatures toward each other into braking engagement with said capstan.

7. A tape feeding mechanism as claimed in claim 6, wherein the electromagnet means for pivotally moving said pair of brake armatures and said armature mounting means are positioned to move said capstan into spaced relation from each of said first and second drive rollers at the same time that it moves the ends of said pair of brake armatures into braking engagement with said capstan.

8. A tape feeding mechanism as claimed in claim 7, wherein said mounting means includes means for disengaging an engaging brake armature from said capstan prior to the moving of said capstan into driving engagement with one of said drive rollers.

9. A tape feeding mechanism as claimed in claim 5, wherein said braking means comprises a pair of spaced elongated brake armatures positioned transverse to and astride said capstan with one end of each of said pair of brake armatures in operative proximity with said capstan, armature mounting means pivotally mounting said pair of brake armatures for pivotal movement toward and away from said capstan, and said control means includes electromagnet means for pivotally moving said ends of said pair of brake armatures toward each other into braking engagement with said capstan, the electromagnet means for pivotally moving said pair of brake armatures and said armature mounting means are positioned to move said capstan into spaced relation from each of said first and second drive rollers at the same time that it moves the ends of said pair of brake armatures into braking engagement with said capstan.

10. A tape feeding mechanism as claimed in claim 3, wherein said braking means comprises a pair of spaced elongated brake armatures positioned transverse to and astride said capstan with one end of each of said pair of brake armatures in operative proximity with said capstan, armature mounting means pivotally mounting said pair of brake armatures for pivotal movement toward and away from said capstan, and said control means includes electromagnet means for pivotally moving said ends of said pair of brake armatures toward each other into braking engagement with said capstan, the electromagnet means for pivotally moving said pair of brake armatures and said armature mounting means are positioned to move said capstan into spaced relation from each of said first and second drive rollers at the same time that it moves the ends of said pair of brake armatures into braking engagement with said capstan, said mounting means including means for disengaging an engaging brake armature from said capstan prior to the moving of said capstan into driving engagement with one of said drive rollers.

References Cited

UNITED STATES PATENTS

| | | | |
|---|---|---|---|
| 2,943,852 | 7/1960 | Quirk | 226—50 |
| 3,007,085 | 10/1961 | Newman | 226—50 X |
| 3,007,086 | 10/1961 | Baumeister | 226—50 X |

ALLEN N. KNOWLES, *Primary Examiner.*